United States Patent
Lee et al.

(10) Patent No.: US 10,423,027 B2
(45) Date of Patent: Sep. 24, 2019

(54) DISPLAY DEVICE PANEL, METHOD FOR READING AN INFORMATION CODE OF THE DISPLAY DEVICE PANEL, AND METHOD FOR MANUFACTURING THE DISPLAY DEVICE PANEL

(71) Applicant: SAMSUNG DISPLAY CO., LTD., Yongin-si, Gyeonggi-Do (KR)

(72) Inventors: Kang Young Lee, Seongnam-si (KR); Sang Hyun Kang, Yongin-si (KR); Dae Hyun Kim, Hwaseong-si (KR); Seung Hwan Kim, Asan-si (KR); Joo Yeol Lee, Seoul (KR); Jang Bog Ju, Seongnam-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 86 days.

(21) Appl. No.: 15/182,977

(22) Filed: Jun. 15, 2016

(65) Prior Publication Data
US 2016/0371558 A1    Dec. 22, 2016

(30) Foreign Application Priority Data
Jun. 16, 2015    (KR) .................. 10-2015-0084909

(51) Int. Cl.
*G02F 1/1335* (2006.01)
*G02F 1/1333* (2006.01)

(52) U.S. Cl.
CPC ...... *G02F 1/133514* (2013.01); *G02F 1/1333* (2013.01); *G02F 1/133351* (2013.01); *G02F 2001/133374* (2013.01)

(58) Field of Classification Search
None
See application file for complete search history.

(56) References Cited

U.S. PATENT DOCUMENTS 8,343,797 B2 *    1/2013    Taliani ............... C23C 14/0629
                                                             257/E27.123
9,324,276 B2 *    4/2016    Baek .................... G09G 3/3406
(Continued)

FOREIGN PATENT DOCUMENTS

JP    2007108590    *    4/2007
JP    2008-218537         9/2008
(Continued)

OTHER PUBLICATIONS

Paul Trujillo, Barcode: The Ultimate Guide to Barcodes, http://www.waspbarcode.com/buzz/barcode/, Apr. 2015.*

*Primary Examiner* — Andrae S Allison
(74) *Attorney, Agent, or Firm* — F. Chau & Associates, LLC

(57) ABSTRACT

A display device panel includes a display area including pixels and a non-display area. Each pixel is connected to one of gate lines and one of data lines. The non-display area includes data pad sections. The non-display area further includes a depiction of a first information code and a depiction of a second information code. The depiction of the first information code is disposed between first two adjacent data pad sections and is apart from an outline of the non-display area by a first distance. The depiction of the second information code is disposed between second two adjacent data pad sections and is apart from the outline of the non-display area by a second distance different from the first distance.

10 Claims, 31 Drawing Sheets

(56) References Cited

U.S. PATENT DOCUMENTS

| | | | |
|---|---|---|---|
| 9,530,802 B2* | 12/2016 | Kim | H01L 27/1288 |
| 2004/0266082 A1* | 12/2004 | You | H01L 29/66765 |
| | | | 438/197 |
| 2005/0219435 A1* | 10/2005 | Oh | G02F 1/13454 |
| | | | 349/43 |
| 2012/0190143 A1* | 7/2012 | Lee | H01L 27/1288 |
| | | | 438/34 |
| 2013/0093657 A1* | 4/2013 | Song | G09G 3/3648 |
| | | | 345/92 |
| 2013/0270582 A1* | 10/2013 | Shin | H01L 33/48 |
| | | | 257/88 |
| 2014/0061657 A1* | 3/2014 | Choi | H01L 27/124 |
| | | | 257/72 |
| 2015/0144911 A1* | 5/2015 | Pang | H01L 51/5246 |
| | | | 257/40 |
| 2015/0155303 A1* | 6/2015 | Kim | H01L 27/1288 |
| | | | 257/59 |
| 2015/0179689 A1* | 6/2015 | Xie | G02F 1/13318 |
| | | | 257/53 |
| 2016/0285044 A1* | 9/2016 | Park | H01L 51/5253 |
| 2016/0300897 A1* | 10/2016 | Song | H01L 51/0026 |

FOREIGN PATENT DOCUMENTS

| | | |
|---|---|---|
| JP | 2013-102033 | 5/2013 |
| KR | 1020090102561 | 9/2009 |
| KR | 1020110085181 | 7/2011 |
| KR | 1020150106486 | 9/2015 |

* cited by examiner

OLA_1 — AB1

AB1

AB1

AB1

AB1

DISPLAY DEVICE PANEL, METHOD FOR READING AN INFORMATION CODE OF THE DISPLAY DEVICE PANEL, AND METHOD FOR MANUFACTURING THE DISPLAY DEVICE PANEL

This application claims priority under 35 U.S.C. § 119 to Korean Patent Application No. 10-2015-0084909, filed on Jun. 16, 2015, in the Korean Intellectual Property Office, the disclosure of which is incorporated by reference herein in its entirety.

TECHNICAL FIELD

The present invention relates to a display device panel, and more particularly, to a method for reading an information code of the display device panel, and a method for manufacturing the display device panel.

DISCUSSION OF THE RELATED ART

In the production or distribution process of display devices, various types of product information such as unique number, production date, resolution, bad history, or the like, pertaining to each display device may be used to ensure more efficient production or distribution process. Methods for recording the product information of each display device may be used.

SUMMARY

According to an exemplary embodiment of the present invention, a display device panel is provided. The display device panel includes a display area and a non-display area. The display area displays an image. The display area includes a plurality of pixels. Each of the pixels is connected to one of a plurality of gate lines and one of a plurality of data lines. The non-display area includes a plurality of data pad sections and a plurality of data pad. Each of the plurality of data pads is connected to one end of each of the plurality of data lines. Each of the data pad sections includes a corresponding one of the plurality of data pads. The non-display area further includes a depiction of a first information code and a depiction of a second information code. The depiction of the first information code is disposed between first two adjacent data pad sections of the data pad sections. The depiction of the first information code is disposed apart from an outline of the non-display area by a first distance. The depiction of the second information code is disposed between second two adjacent data pad sections of the data pad sections. The depiction of the second information code is disposed apart from the outline of the non-display area by a second distance. The first distance is different from the second distance.

The depiction of the first information code may include at least one of a first character pattern having a form of character or a first special pattern having a form based a first predetermined rule. The depiction of the second information code may include at least one of a second character pattern having a form of character or a second special pattern having a form based on a second predetermined rule.

The first character pattern may have a same form as the second character pattern. The first special pattern may have a same form as the second special pattern.

The first character pattern may include a first sub-character pattern and a second sub-character pattern. The first sub-character pattern may be disposed on one side of the first special pattern, and the second sub-character pattern may be disposed on another side of the first special pattern.

The first special pattern may include a first sub-special pattern and a second sub-special pattern. The second special pattern may include a third sub-special pattern and a fourth sub-special pattern. The first character pattern and the second character pattern may have a same form as each other. The first sub-special pattern and the third sub-special pattern may have a same form as each other. The second sub-special pattern and the fourth sub-special pattern may have different forms from each other.

The second sub-special pattern may include information corresponding to the first distance, and the fourth sub-special pattern may include information corresponding to the second distance.

The depictions of the first information code and the second information code may be formed on a same layer as the gate line. The depictions of the first information code and the second information code may be formed using a same material.

At least one of the depiction of the first information code and the depiction of the second information code may include information corresponding to production of the display device panel.

The non-display area may further include a depiction of a third information code. The depiction of the third information code may be disposed between third two adjacent data pad sections of the data pad sections. The depiction of the third information code may be disposed apart from the outline of the non-display area by a third distance. The third distance may be different from each of the first distance and the second distance.

The non-display area may further include depictions of fourth to sixth information codes. The depiction of the fourth information code may be disposed between fourth two adjacent data pad sections of the data pad sections and may be disposed apart from the outline of the non-display area by a fourth distance. The depiction of the fifth information code may be disposed between fifth two adjacent data pad sections of the data pad sections and may be disposed apart from the outline of the non-display area by a fifth distance. The depiction of the sixth information code may be disposed between sixth two adjacent data pad sections of the data pad sections and may be disposed apart from the outline of the non-display area by a sixth distance. The fourth distance may be the same as the first distance. The fifth distance may be the same as the second distance. The sixth distance may be the same as the third distance.

The non-display area may further include depictions of seventh and eighth information codes. Each of the depictions of the seventh and eighth information codes may be disposed in an area other than an area between the data pad sections. The depiction of the seventh information code may be disposed apart from the outline of the non-display area by a seventh distance. The depiction of the eighth information code may be disposed apart from the outline of the non-display area by an eighth seventh distance. The seventh distance and the eighth distance may be different from each other.

According to an exemplary embodiment of the present invention, a method for reading information of a display device panel is provided. The method may include capturing an image of the display device panel, recognizing a first information code and a second information code from the captured image, determining a final information code by synthesizing the recognized first and second information codes, and acquiring the information of the display device panel from the final information code.

Determining the final information code may further include comparing the recognized first and second information codes with each other to determine an overlap area in which depictions of the first and second information codes have a same form as each other, and synthesizing the first and second information codes based on the overlap area to determine the final information code.

The depiction of the first information code may include first position information thereof within the display device panel. The depiction of the second information code may include second position information thereof within the display device panel. The first and second information codes may be synthesized based on the first and second position information.

The depiction of the first information code may include at least one of a first character pattern having a form of character or a first special pattern having a form based a first predetermined rule. The depiction of the second information code may include at least one of a second character pattern having a form of character or a second special pattern having a form based on a second predetermined rule. Recognizing the first information code and the second information code from the captured image may include recognizing the first special pattern and the second special pattern.

According to an exemplary embodiment of the present invention, a method for manufacturing a display device panel is provided. The method includes preparing a display device substrate, forming a gate line and depictions of first and second information codes on the display device substrate, forming a data line on the display device substrate, and forming a pixel electrode on the display device substrate. Forming the gate line and the depictions of the first and second information codes includes applying a conductive material on the display device substrate, forming a photoresist layer on the conductive material, irradiating the photoresist layer with ultraviolet light in forms of the gate line and the depictions of the first and second information codes, and developing and etching the display device substrate.

Irradiating the photoresist layer with ultraviolet light in the forms of the gate line and the depictions of the first and second information codes may include irradiating the photoresist layer with the ultraviolet light so that the form of the depiction of the first information code and the form of the depiction of the second information code are not parallel to each other.

Irradiating the photoresist layer with the ultraviolet light in the forms of the gate line and the depictions of the first and second information codes may include irradiating the photoresist layer with the ultraviolet light using a mask in which a plurality of grooves is formed in the form of the gate line and selectively irradiating the photoresist layer with the ultraviolet light to an area of the photoresist layer in which the depictions of the first and second information codes are formed.

Forming the depictions of the first and second information codes may further include forming a depiction of a third information code. Irradiating the photoresist layer with the ultraviolet light in the forms of the gate line and the depictions of the first and second information codes may further include irradiating the photoresist layer with the ultraviolet light in a form of the depiction of the third information code.

According to an exemplary embodiment of the present invention, a display device panel is provided. The display device panel includes a thin film transistor substrate in which a plurality of pixels is formed. The thin film transistor substrate includes a display area displaying an image and a non-display area excluding the display area. The display area includes a plurality of pixels. Each of the pixels is connected to one of a plurality of gate lines and one of a plurality of data lines. The non-display area includes a plurality of gate pad sections. Each of the gate pad sections is connected to one of the plurality of gate lines. The non-display area may further include a depiction of a first information code and a depiction of a second information code. The depiction of the first information code is disposed between first two adjacent gate pad sections of the gate pad sections. The depiction of the first information code is disposed apart from an outline of the thin film transistor substrate by a first distance. The depiction of the second information code is disposed between second two adjacent gate pad sections of the gate pad sections. The depiction of the second information code is disposed apart from the outline of the thin film transistor substrate by a second distance. The first distance is different from the second distance.

The non-display area may include a plurality of data pad sections. Each of the data pad sections may be connected to one of the plurality of data lines. The non-display area may further include a depiction of a third information code disposed between two adjacent data pad sections of the data pad sections.

BRIEF DESCRIPTION OF THE DRAWINGS

A more complete appreciation of the present invention and many of the attendant aspects thereof will be readily obtained as the same becomes better understood by reference to the following detailed description when considered in connection with the accompanying drawings, wherein.

DETAILED DESCRIPTION OF THE EMBODIMENTS

Figure 1:
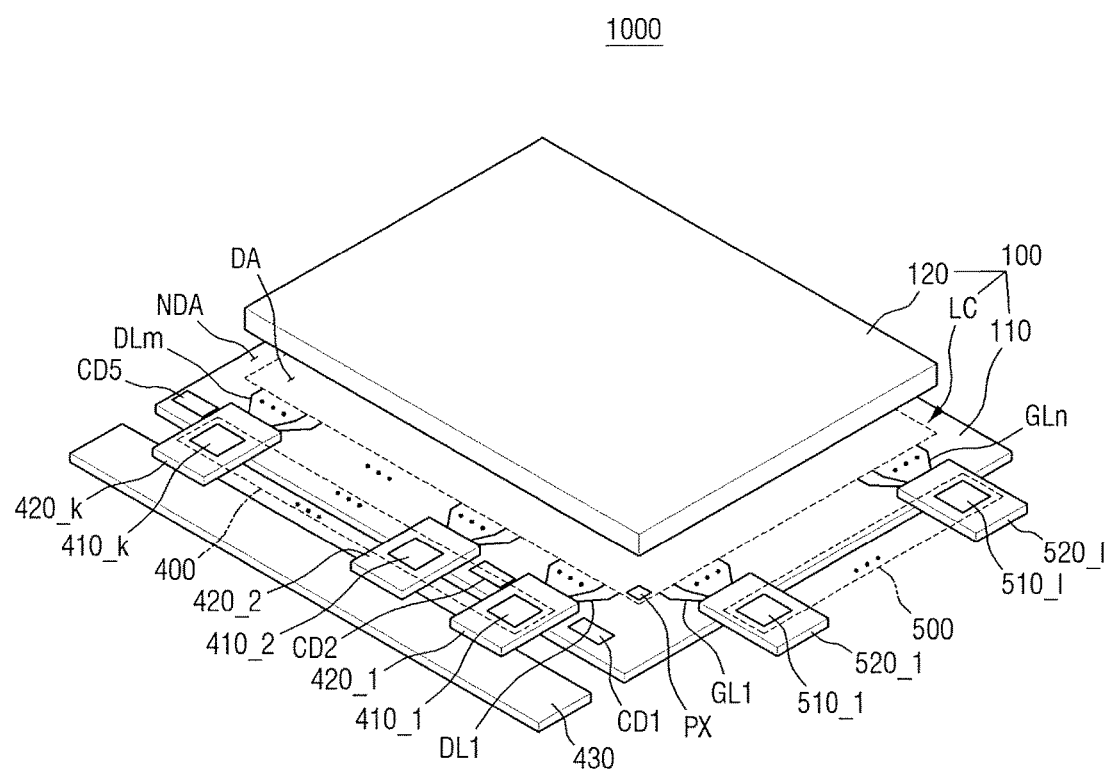
FIG. 1 is an exploded perspective view of a liquid crystal display device according to an exemplary embodiment of the present invention.

Exemplary embodiments of the present invention will now be described more fully with reference to the accompanying drawings. The present invention may, however, be embodied in many different forms and should not be construed as being limited to the embodiments set forth herein like reference numerals may refer to like elements throughout the specification and drawings.

As used herein, the singular forms "a", "an" and "the" are intended to include the plural forms as well, unless the context clearly indicates otherwise.

It will be understood that when an element or layer is referred to as being "on", "connected to" or "coupled to" another element or layer, it can be directly on, connected or coupled to the other element or layer or intervening elements or layers may be present. As used herein, the term "and/or" includes any and all combinations of one or more of the associated listed items.

Hereinafter, exemplary embodiments of the present invention will be described with reference to the accompanying drawings.

FIG. 1 is an exploded perspective view of a liquid crystal display device according to an exemplary embodiment of the present invention.

Referring to FIG. 1, a liquid crystal display device 1000 according to an exemplary embodiment of the present invention includes a display panel 100, a data driver 400 and a gate driver 500.

The display panel 100 may include a thin film transistor substrate 110 in which a plurality of pixels PX is formed, a color filter substrate 120 in which a common electrode and a color filter are formed to face the thin film transistor substrate 110, and a liquid crystal layer LC which is interposed between the thin film transistor substrate 110 and the color filter substrate 120.

The thin film transistor substrate 110 may include a plurality of pixel electrodes each corresponding to each of the pixels PX, and a plurality of thin film transistors (TFTs) each connected to each of the corresponding pixel electrodes. The thin film transistors may be provided with data voltages through corresponding data lines DL1 to DLm in response to the gate signals supplied through corresponding gate lines GL1 to GLn. For example, the data lines DL1 to DLm may extend in a first direction D1 and may be spaced apart in a second direction D2 crossing the first direction, and the gate lines GL1 to GLn may extend in the second direction D2 and may be spaced apart in the first direction D1.

The data driver 400 may be provided with video signals (e.g., image signal) and data control signals from a timing controller. The data driver 400 may generate the analog data voltages corresponding to the video signals in response to the data control signal. The data driver 400 may provide the data voltages to the pixels PX through the data lines.

The data driver 400 may include a plurality of data driving chips 410_1 to 410_k (k is an integer equal to or greater than 1). Each of the data driving chips 410_1 to 410_k is mounted on a corresponding one of a plurality of first flexible circuit boards 420_1 to 420_k and may be connected to the drive circuit board 430 and data pads of a non-display area NDA. Each of the data driving chips 410_1 to 410_k may be mounted on each of the flexible circuit boards 420_1 to 420_k. Each of the flexible circuit boards 420_1 to 420_k may be connected to a corresponding one of the data pads through an anisotropic conductive film.

The gate driver 500 may generate the gate signals in response to the gate control signal that is provided from the timing controller mounted on the drive circuit board 430. The gate signals may sequentially be provided to pixels PX through the gate lines GL1 to GLn row by row. The gate control signal may be provided to the gate driver 500 via second flexible circuit boards 520_1. The gate driver 500 may include a plurality of gate driving chips 510_1. Each of the gate driving chips 510_1 is mounted on a corresponding one of the second flexible circuit boards 520_1 and may be connected to the corresponding one of the second flexible circuit boards 520_1 through the anisotropic conductive films of the gate pad of the non-display area NDA.

The gate driving chips 510_1 of the gate driver 500 may generate the gate signals in response to the gate control signal. The gate driving chips 510_1 may sequentially provide the gate signals to the pixels PX row by row.

In an exemplary embodiment of the present invention, although a tape carrier package (TCP) type has been described as a manner in which the gate driving chips 510_1 and the data driving chips 410_1 to 410_k are mounted on the first and second flexible circuit boards 520_1, but the present invention is not limited thereto, and the chips (e.g., 510_1 and 520_1) may be mounted in the non-display area in a chip-on-glass (COG) manner. In addition, the gate driver 500 may be formed in a manner of an amorphous silicon gate (ASG) that is integrally formed in the non-display portion.

The thin film transistor substrate 110 may include a plurality of data lines DL1 to DLm, a plurality of gate lines GL1_GLn, a plurality of pixels PX and information codes CD1 to CDk. Here, each of m, n, and k are integers equal to or greater than 1. These will be described in more detail with reference to FIG. 2.

Color filters may be formed on one side surface of the color filter substrate 120. The color filter may correspond to a color pixel PX that represents one of red, green and blue. The liquid crystal display device 1000 may include a backlight unit which is disposed behind the display panel 100 to provide light to the display panel 100. The backlight unit may be formed in a direct type that supplies light from the bottom of the display panel 100 or an edge type that supplies light from the side surface of the display panel 100, and the backlight unit may be formed in other forms without being limited thereto.

The data voltages are applied to the pixel electrodes by the thin film transistors, and the common voltage may be applied to the common electrode. A liquid crystal alignment of the liquid crystal layer LC may be changed by an electric field formed between the pixel electrodes and the common electrode. Transmittance of light provided from the backlight unit is adjusted depending on the changed alignment of the liquid crystals, and thus, an image may be displayed.

Figure 2:
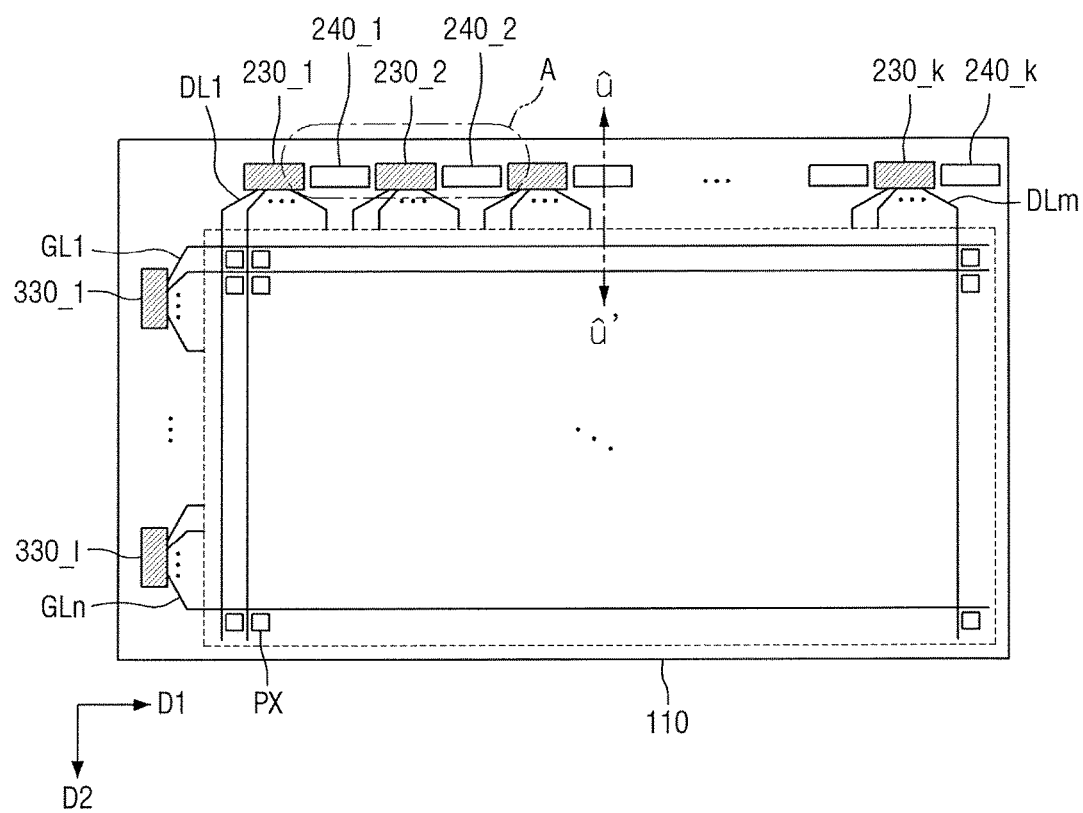
FIG. 2 is a plan view of a thin film transistor substrate according to an exemplary embodiment of the present invention.

FIG. 2 is a plan view of a thin film transistor substrate according to an exemplary embodiment of the present invention.

Referring to FIG. 2, the thin film transistor substrate 110 includes a display area DA and a non-display area NDA.

The display area DA is an area that may display an actual image, and may be located in the center of the thin film transistor substrate 110. The display area DA may include a plurality of pixels PX. Each of the pixels PX is formed in an area in which a corresponding one of the plurality of gate lines GL1_GLn intersects a corresponding one of the plurality of data lines DL1 to DLm. Each of the pixels PX may display a particular color, for example, red, green, blue, or the like. Further, a group of pixels PX may be configured to be an upper level pixel which is capable of displaying various colors other than white. For example, the upper level pixel may include the pixels PX of red, green and blue. Each of the plurality of pixels PX of the display area DA may display a color in accordance with a corresponding data signal and a corresponding gate signal which are respectively transmitted from a data line and a gate line.

The non-display area NDA is a remaining area except the display area DA on the thin film transistor substrate 110. For example, the non-display area NDA may surround the display area DA. Data pad sections 230_1 to 230_k, gate pad sections 330_1 and information codes 240_1 to 240_k may be formed in the non-display area NDA. For example, the data pad sections 230_1 to 230_k may be arranged in the first direction D1, the gate pad sections 330_1 may be arranged in the second direction D2, and some of the information codes 240_1 to 240_k may be arranged in the first direction or the second direction.

Each of the data pad sections 230_1 to 230_k may include a plurality of data pads. Also, the data pad sections 230_1 to 230_k may correspond to an area in which a single data driver chip (see FIG. 1) is mounted. Each of the data pads may be connected to a corresponding one of the data lines DL1 to DLm, and may be connected to a pin included in the data driver chip.

In addition, each of the data pad sections 230_1 to 230_k may correspond to each of the corresponding data driving chips. The data signal may be provided to the respective data pads disposed in the data pad sections 230_1 to 230_k from the data driving chips, and the data signals may sequentially be provided to the pixels PX row by row through the data lines DL1 to DLm. The data lines are respectively connected to the data pads.

Each of the gate pad sections 330_1 may include a plurality of gate pads. The gate pad sections 330_1 may correspond to an area in which a single gate driving chip (see FIG. 1) is mounted. Each of the gate pads may be connected to each of the corresponding gate lines GL1 to GLn, and may be connected to a pin included in the gate driving chip.

The gate pad sections 330_1 may be connected to each of the corresponding gate driving chips. The gate signals may respectively be provided to the respective gate pads, each of which is disposed on the gate pad sections 330_1 from the gate driving chips, and the gate signals may sequentially be provided to the pixels PX row by row through the gate lines GL1 to GLn connected to the gate pads, respectively.

The gate driver 500 may be formed in a manner of an amorphous silicon gate (ASG) that is integrally formed in the non-display area NDA, and in this case, separate gate pad sections 330_1 are not formed as described above.

The first to k-th information codes 240_1 to 240_k have shapes that are embossed or engraved to include various types of information corresponding to the production of the display panel 100. As illustrated in FIG. 2, each of the information codes 240_1 to 240_k may be formed in an area between the data pads 230_1 to 230_k or on the side surface thereof.

The first to k-th information codes 240_1 to 240_k may be numbers, characters, particular shapes, or the like, and may be formed in the non-display area NDA. The first to k-th information codes 240_1 to 240_k may include various types of information on the liquid crystal display device 1000, e.g., unique number, manufacturing date, resolution, size, and bad history of the liquid crystal display device 1000. However, the present invention is not limited thereto, and the first to k-th information codes 240_1 to 240_k may include other information.

In manufacturing the liquid crystal display 1000, the first to k-th information codes 240_1 to 240_k may allow quality assurance of the liquid crystal display 1000, history tracking and the production management of the liquid crystal display 1000. For example, there are various processing stages in producing the liquid crystal display device 1000, and when the production history of the liquid crystal display device 1000 is needed for a user or a production system, information on the production history of the liquid crystal display device 1000 may be founded by reading the first to k-th information codes 240_1 to 240_k, and a process of reading the first to k-th information codes 240_1 to 240_k may be performed for each of the processing stages.

Each of the information codes 240_1 to 240_k may include character patterns or special patterns. The character patterns are formed in the shape of general characters or numbers, and thus a user who manages the production of the liquid crystal display device 1000 may intuitively recognize which characters and numbers are included in the information codes 240_1 to 240_k. In addition, the special patterns may have particular patterns or shapes according to a predetermined rule and may include more amount of information than the character patterns.

Reading of the special patterns may be performed by image recognition using a separate device. When an image obtained by capturing a special pattern using a camera is recognized and a recognition device processes the captured image, the information of the special patterns may be read.

In an exemplary embodiment of the present invention, the first to k-th information codes 240_1 to 240_k may include only the special patterns without the character patterns. In an exemplary embodiment of the present invention, the first to k-th information codes 240_1 to 240_k may include only the character patterns without the special patterns. In an exemplary embodiment of the present invention, a first group of information codes among the first to k-th information codes 240_1 to 240_k may include only the character patterns without the special patterns, a second group of information codes among the first to k-th information codes 240_1 to 240_k may include only the special patterns without the character patterns, and a third group of information codes (e.g., the remaining information codes except for the first and second groups of information codes) of the first to k-th information codes 240_1 to 240_k may have the character patterns and the special patterns. However, the present invention is not limited thereto, and a user may arbitrarily change a type of pattern included in each of the information codes 240_1 to 240_k depending on the usage and the purpose of the first to k-th information codes 240_1 to 240_k.

As illustrated in FIG. 2, the plurality of information codes 240_1 to 240_k may be formed in the non-display area NDA. For example, the plurality of information codes 240_1 to 240_k is formed in a plurality of areas of the non-display area NDA, and thus, when some of the information codes 240_1 to 240_k formed in some areas are damaged or covered with other structure such as a black matrix during the production process of the liquid crystal display device 1000, product information on the liquid crystal display device 1000 may be obtained through the information codes 240_1 to 240_k formed in other areas, and thus, the reliability in reading the information codes 240_1 to 240_k may be increased.

FIG. 2 illustrates a case where the information codes 240_1 to 240_k are formed in areas between the data pad sections 230_1 to 230_k, but the present invention is not limited thereto, and at least one of the information codes 240_1 to 240_k may be formed in an arbitrary area of the non-display area NDA other than the areas between the data pad sections 230_1 to 230_k. For example, when the gate pad sections 330_1 are formed, the information codes 240_1 to 240_k may be formed in areas between the gate pad sections 330_1. In an exemplary embodiment of the present invention, some of the information codes 240_1 to 240_k formed in the areas between the data pad sections 230_1 to 230_k may be formed to have different distances from each other from an outline of the non-display area NDA. In an exemplary embodiment of the present invention, some of the information codes 240_1 to 240_k formed in the areas between the data pad sections 230_1 to 230_k may be formed to have different distances from each other from an outline of the thin film transistor substrate 110. In an exemplary embodiment of the present invention, some of the information codes 240_1 to 240_k formed in the areas between the gate pad sections 330_1 may be formed to have different distances from each other from an outline of the non-display area NDA. In an exemplary embodiment of the present invention, some of the information codes 240_1 to 240_k formed in the areas between the gate pad sections 330_1 may be formed to have different distances from each other from an outline of the thin film transistor substrate 110. For example, the outline of the non-display area NDA may substantially be parallel to the outline of the thin film transistor substrate 110.

The locations and shapes (e.g., patterns) of the information codes 240_1 to 240_k will be described in more detail with reference to FIG. 3.

Figure 3:
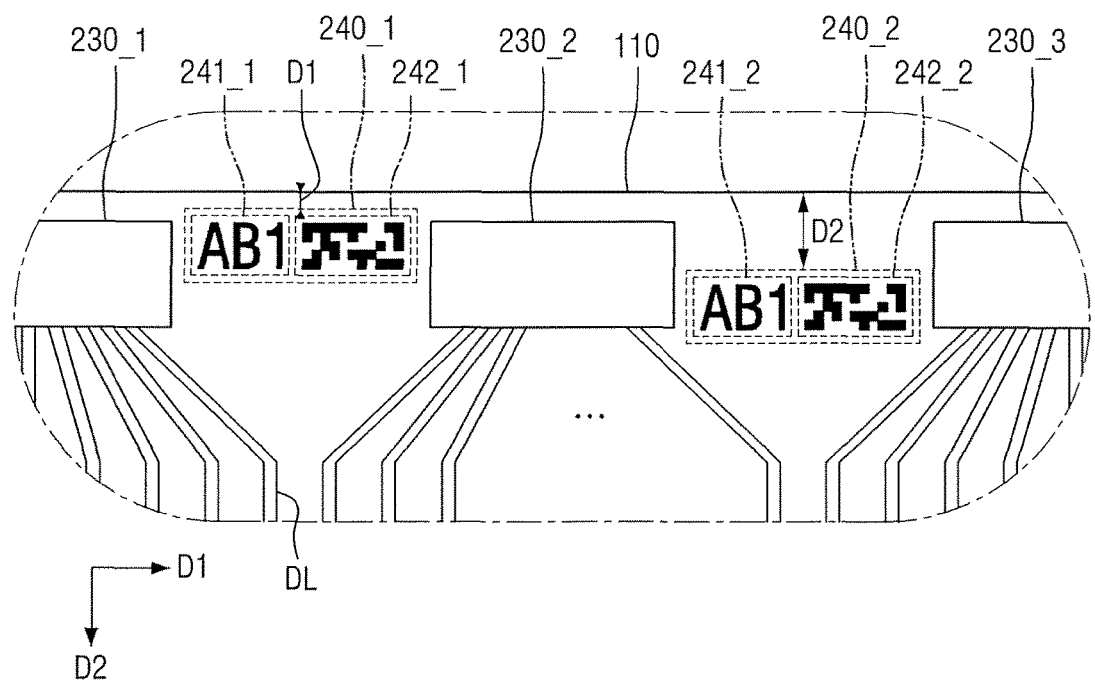
FIG. 3 is an enlarged plan view illustrating an area A of FIG. 2 according to an exemplary embodiment of the present invention.

FIG. 3 is an enlarged plan view illustrating an area A of FIG. 2 according to an exemplary embodiment of the present invention.

Referring to FIG. 3, the first information code 240_1 may be located between the first data pad section 230_1 and the second data pad section 230_2, and the second information code 240_2 may be located between the second data pad section 230_2 and the third data pad section 230_3.

The first information code 240_1 may include a first character pattern 241_1 and a first special pattern 242_1, and the second information code 240_2 may include a second character pattern 241_2 and a second special pattern 242_2. The first character pattern 241_1 may have the same shape as the second character pattern 241_2, and the first special pattern 242_1 may have the same shape as the second special pattern 242_2. In this case, when one of the first and second information code 240_1 and 240_2 is damaged so that the first character pattern 241_1 or the second character pattern 241_2 cannot be read by human's eye or a camera, another one (e.g., the undamaged information code) of the first and second information code 240_1 and 240_2 may be used to obtain information of the first character pattern 241_1 or the second character pattern 241_2 on the display device. In addition, when one of the first and second information code 240_1 and 240_2 is damaged so that the first special pattern 242_1 or the second special pattern 242_2 cannot be read by human's eye or a camera, another one (e.g., the undamaged information code) of the first and second information code 240_1 and 240_2 may be used to obtain information of the first special pattern 242_1 or the second special pattern 242_2 on the display device. Thus, reliability in reading the information codes may be increased.

For example, the information codes 240_1 to 240_k may be formed in different positions from each other in a vertical direction so that the information codes 240_1 to 240_k are not disposed on the same line. As illustrated in FIG. 3, the first information code 240_1 may be formed apart from the outline of the non-display area NDA by a first distance d1, and the second information code 240_2 may be formed apart from the outline of the non-display area NDA by a second distance d2.

In addition, the non-display area NDA may include more number of information codes. In this case, each of the information codes 240_1 to 240_k may be formed apart from the outline of the non-display area NDA by a predetermined distance. In an exemplary embodiment of the present invention, all the information codes 240_1 to 240_k may be formed apart from the outline of the non-display area NDA by different distances from each other. In an exemplary embodiment of the present invention, some of the information codes 240_1 to 240_k may be formed apart from the outline of the non-display area NDA by different distances from each other, the others of the information codes 240_1 to 240_k may be formed apart from the outline of the non-display area NDA by the same distance as each other. For example, if it is assumed that each of the first to sixth information codes 230_1 to 230_6 is formed away from the outline of the non-display area NDA by a corresponding one of first to sixth distances, in an exemplary embodiment, the first to sixth distances may be different from each other. In an exemplary embodiment, the first to third distances may be different from each other, the first distance may be the same as the fourth distance, the second distance may be the same as the fifth distance, and the third distance may be the same as the sixth distance.

When some or all areas of the character patterns and the special patterns are cut in the cutting process of the thin film transistor substrate 110, or some or all areas of the character patterns and the special patterns may overlap a black matrix in the process of forming the black matrix on the thin film transistor substrate 110, the character patterns or the special patterns formed in each of the code areas might not be read or recognized. This will be described in more detail with reference to FIGS. 4 to 8.

Figure 4:
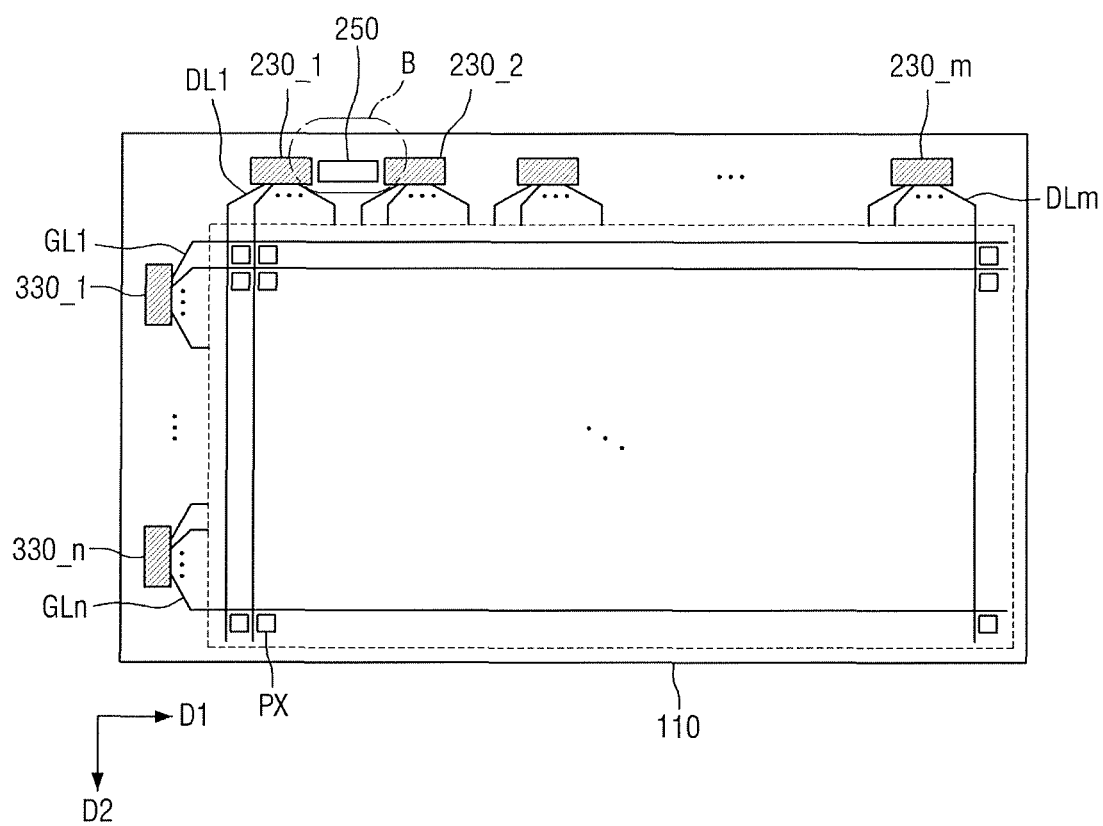
FIG. 4 is a plan view of a thin film transistor substrate that includes only one information code.

FIG. 4 is a plan view of a thin film transistor substrate in which only one information code is formed.

Referring to FIG. 4, since only one information code 250 is formed in the thin film transistor substrate 110, a single character pattern 251 and a single special pattern 252 may be present in the thin film transistor substrate 110. In this case, when the information code 250 is damaged, the reliability in reading the information code 250 might not be ensured.

FIGS. 5 to 8 are enlarged views of an area corresponding to an area B of FIG. 4.

Figure 5:
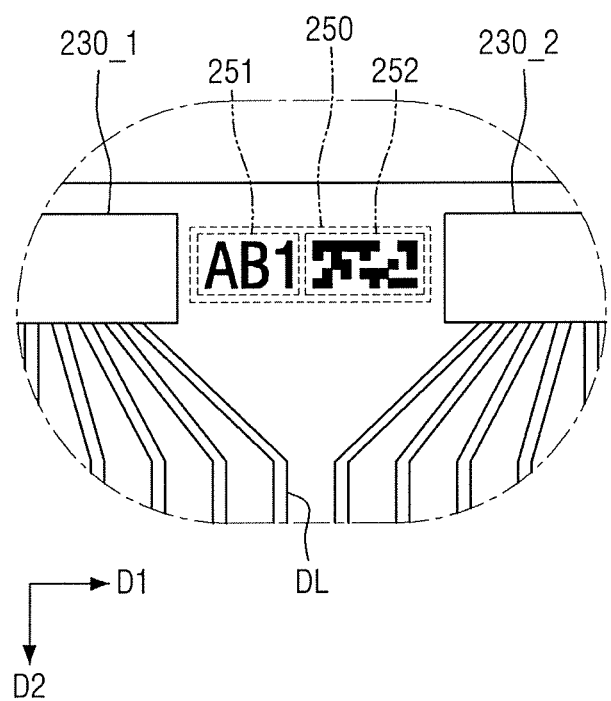
FIGS. 5 to 8 are enlarged views of an area corresponding to an area B of FIG. 4.
Figure 6:
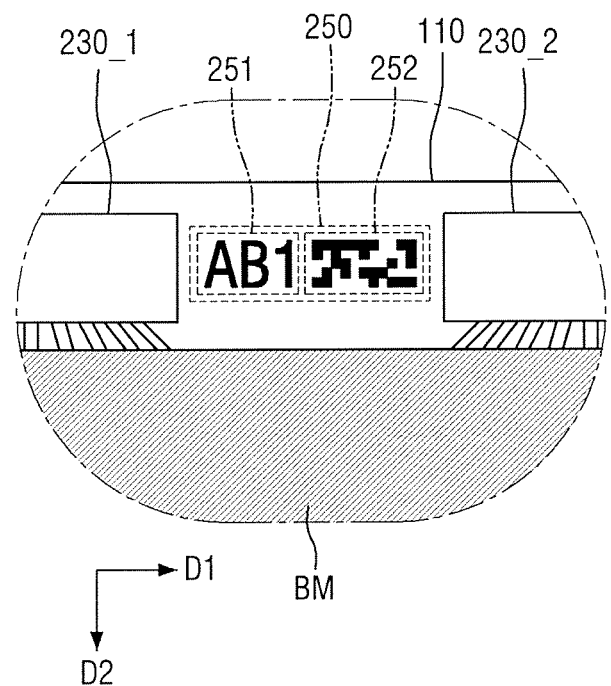

As illustrated FIG. 5, when the thin film transistor substrate 110 is correctly cut, no damage occurs in an area of the information code 250, and thus, the information code 250 may be correctly read. In addition, as illustrated in FIG. 6, the black matrix BM is corrected stuck to the thin film transistor substrate 110, and thus, the information code 250 may be correctly read without being covered by the black matrix BM.

Figure 7:
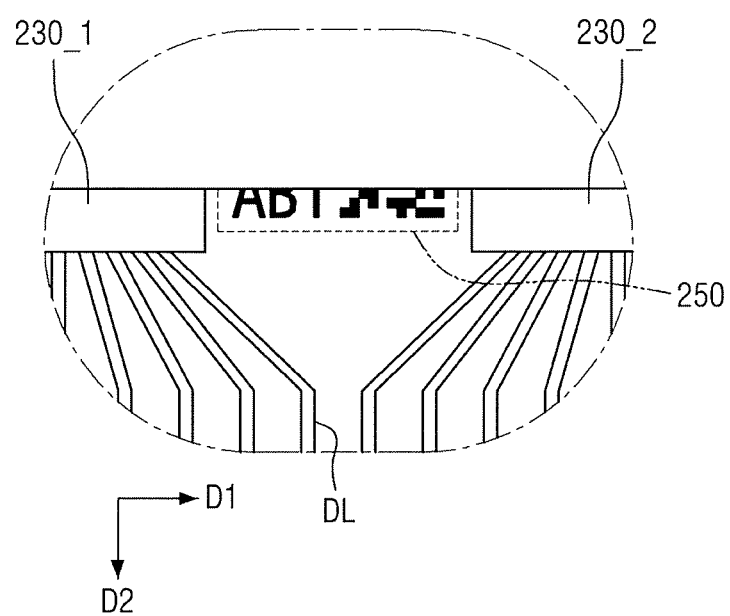

As illustrated in FIG. 7, the thin film transistor substrate 110 is incorrectly cut (e.g., a partial area of the information code 250 is cut and removed), and thus, the information code 250 might not be read. In the case of the character pattern 251 being identified by the user's eyes, in some cases, the character pattern 251 may be analyzed even if a part of the character pattern 25 is cut. In the case of the special pattern 252 being read by the recognition device, when a part of the special pattern 252 is cut or damaged, the whole information in the information code might not be read or recognized.

Figure 8:
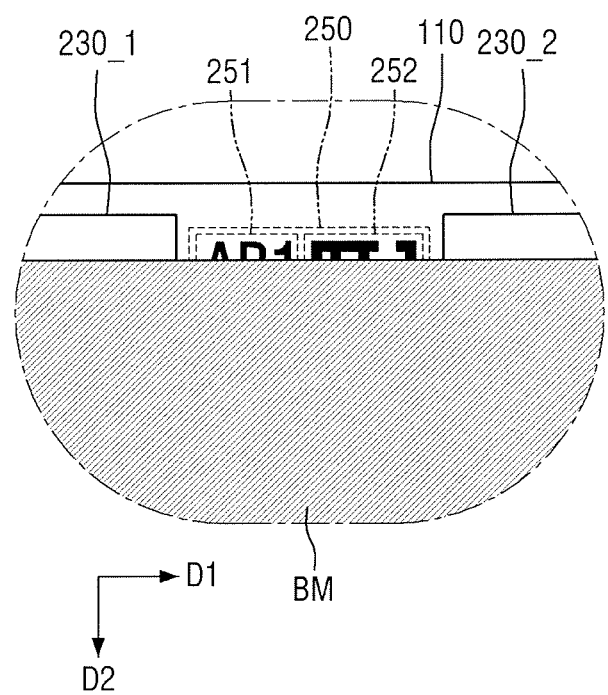

As illustrated in FIG. 8, when the black matrix BM is incorrectly formed in the thin film transistor substrate 110, a partial area of the information code 250 overlaps the black matrix BM and the partial area of the information code 250 is covered by the black matrix BM, and thus, the information code 250 might not be read.

When the information code 250 is not read, information on the production history of the liquid crystal display device 1000 might not be recognized, and problems may occur in the process of manufacturing the product, and thus, interruption of the manufacturing process of the product may occur in, e.g., the case of an automated process. When the information codes 240_1 and 240_2 are formed in the manner illustrated in FIG. 3 according to an exemplary embodiment of the present invention, even if some of the information codes 240_1 to 240_k are not read, another of the information codes 240_1 to 240_k may be read, and thus, the aforementioned interruption of the manufacturing process of the product might not occur. This will be described in more detail with reference to FIGS. 9 and 10.

Figure 9:
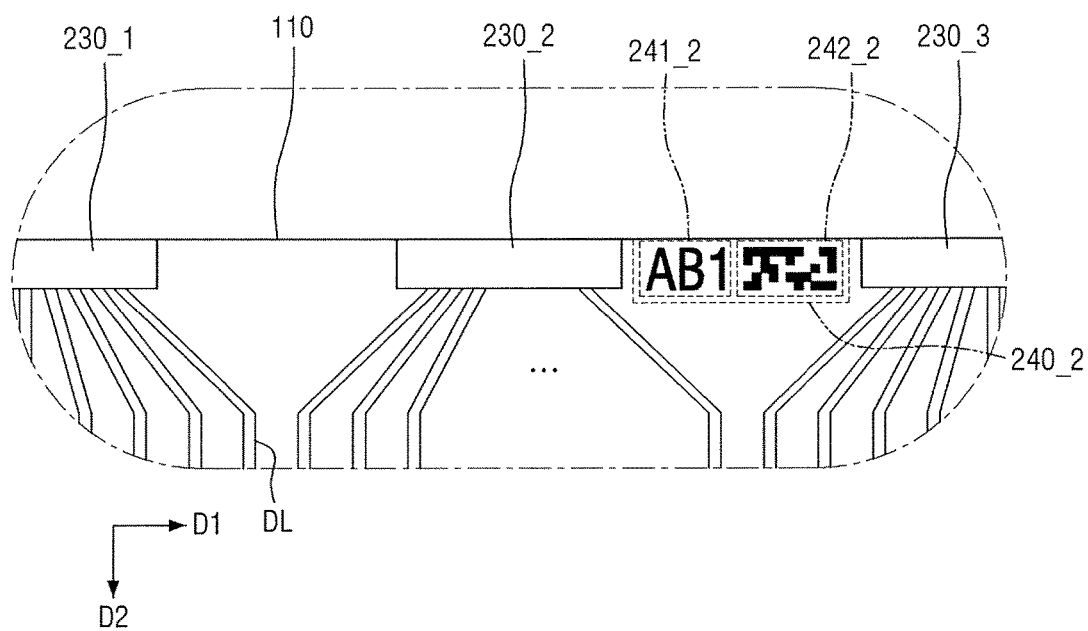
FIG. 9 is an enlarged plan view of an area corresponding to the area A of FIG. 3 of a thin film transistor substrate according to an exemplary embodiment of the present invention.
Figure 10:
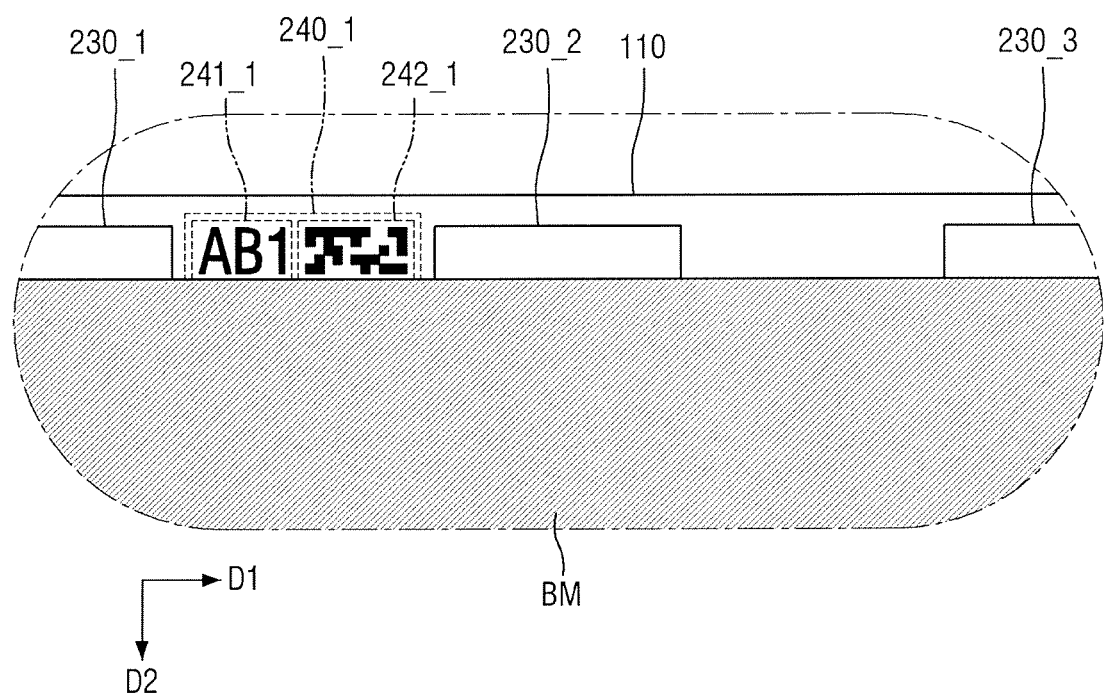
FIG. 10 is an enlarged plan view of an area corresponding to the area A of FIG. 3 of a thin film transistor substrate according to an exemplary embodiment of the present invention.

FIG. 9 is an enlarged plan view of an area corresponding to the area A of FIG. 3 of a thin film transistor substrate according to an exemplary embodiment of the present invention, and FIG. 10 is an enlarged plan view of an area corresponding to the area A of FIG. 3 of a thin film transistor substrate according to an exemplary embodiment of the present invention.

FIG. 9 illustrates a case where the thin film transistor substrate 110 is incorrectly cut and some of the information codes 240_1 and 240_2 is cut or removed. In this case, when a plurality of information codes 240_1 and 240_2 is formed, a plurality of character patterns 241_1 and 241_2 having the same shape is formed in each of the plurality of information codes 240_1 and 240_2, and a plurality of special patterns 242_1 and 242_2 have the same shape are formed in each of the plurality of information codes 240_1 and 240_2. Thus, when one of the information codes 240_1 and 240_2 is cut and removed so that a corresponding one of the character patterns 241_1 and 241_2 or a corresponding one of the special pattern 242_1 and 242_2 cannot be read, the reading may be performed through another ones of the information codes 240_1 and 240_2, so that the character patterns 241_1 and 241_2 or the special patterns 242_1 and 242_2 of the another ones of the information codes 240_1 and 240_2 may be read.

In a case where the thin film transistor substrate 110 is incorrectly cut, when a plurality of information codes 240_1 and 240_2 (or the character patterns 241_1 and 241_2 and the special patterns 242_1 and 242_2 in the information codes 240_1 and 240_2) are arranged on the same line in a particular direction, all the character patterns 241_1 and 241_2 and the special patterns 242_1 and 242_2 are damaged at the same level since the cut line is formed in a straight line. Thus, the information codes 240_1 and 240_2 might not be read.

In addition, as illustrated in FIG. 3, when the information codes 240_1 and 240_2 are formed apart from the outline of the non-display area NDA by different distances from each other, the information codes 240_1 and 240_2 (or the character patterns 241_1 and 241_2 and the special patterns 242_1 and 242_2 in the information codes 240_1 and 240_2) are not located on the same line. Thus, when one of the information codes 240_1 and 240_2 is damaged, the character patterns 241_1 and 241_2 and the special patterns 242_1 and 242_2 of another one (e.g., the undamaged information code) of the information codes 240_1 and 240_2 may be read. Thus, the reliability in reading the information codes 240_1 and 240_2 may be increased.

FIG. 10 illustrates a case where the black matrix BM is incorrectly formed in the thin film transistor substrate 110, some of the information codes 240_1 and 240_2 overlap the black matrix BM, and the codes might not be read. In this case, when the plurality of information codes 240_1 and 240_2 is formed, the plurality of character patterns 241_1 and 241_2 having the same shape and the plurality of special patterns 242_1 and 242_2 having the same shape are formed in each of the plurality of information codes 240_1 and 240_2. Thus, when one of the information codes 240_1, 240_2 overlaps the black matrix BM and a corresponding one of the character patterns 241_1 and 241_2 or a corresponding one of the special patterns 242_1 and 242_2 cannot be read, the reading may be performed through another ones of the information codes 240_1 and 240_2, so that the character patterns 241_1 and 241_2 or the special patterns 242_1 and 242_2 of the another ones of the information codes 240_1 and 240_2 may be read.

For example, as illustrated in FIG. 10, the black matrix BM has a shape of a straight line in one end and may overlap some of the information codes 240_1 and 240_2. At this time, when the plurality of information codes 240_1 and 240_2 (or the character patterns 241_1 and 241_2 and the special patterns 242_1 and 242_2 in the information codes 240_1 and 240_2) are arranged on the same line in a particular direction, all the character patterns 241_1 and 241_2 and the special patterns 242_1 and 242_2 are damaged at the same level. Thus, the information codes might not be read.

In addition, as illustrated in FIG. 3, when the information codes 240_1 and 240_2 are formed apart from the outline of the non-display area NDA by different distances from each other, the information codes 240_1 and 240_2 (or the character patterns 241_1 and 241_2 and the special patterns 242_1 and 242_2 in the information codes 240_1 and 240_2) are not located on the same line. Thus, when one of some information codes 240_1 and 240_2 is covered with the black matrix BM, the character patterns 241_1 and 241_2 and the special patterns 242_1 and 242_2 of another ones of the information codes 240_1 and 240_2 which is covered with the black matrix BM may be read. Thus, the reliability in reading the information codes 240_1 and 240_2 may be increased.

Figure 11:
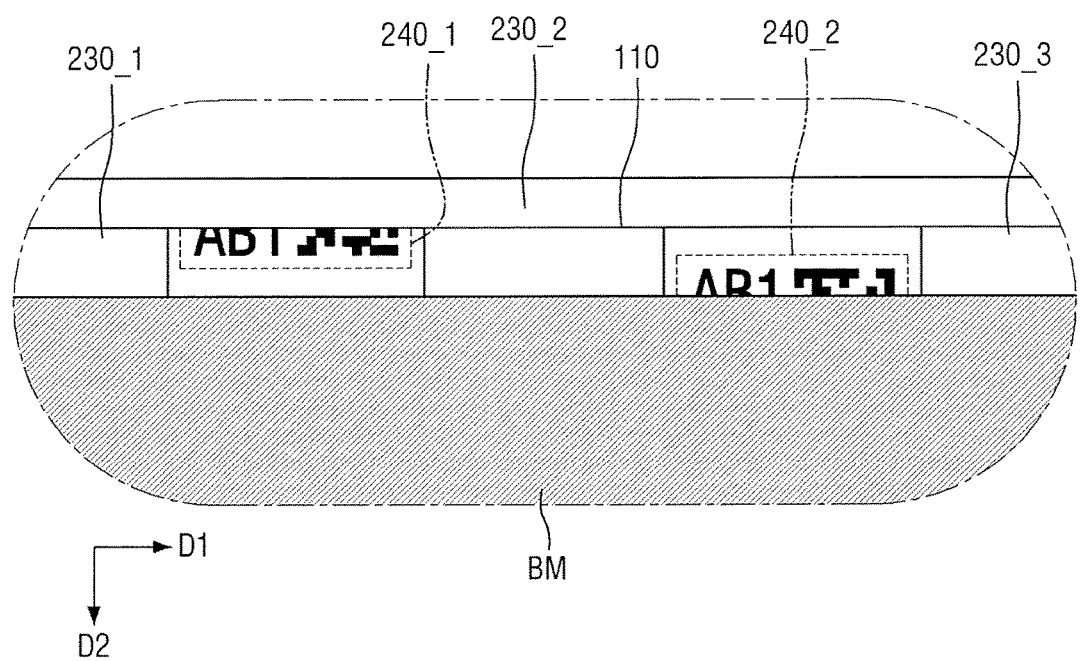
FIG. 11 is an enlarged plan view of an area corresponding to the area A of FIG. 3 of a thin film transistor substrate according to an exemplary embodiment of the present invention.

FIG. 11 is an enlarged plan view of an area corresponding to the area A of FIG. 3 of a thin film transistor substrate according to an exemplary embodiment of the present invention.

The remaining constituents of FIG. 11 except some constituents illustrated differently from FIG. 3 are the same as those of FIG. 3, and duplicate descriptions will be omitted. Hereinafter, the constituents different from FIG. 3 will be described.

Referring to FIG. 11, a partial area in an upward direction of the thin film transistor substrate 110 may be cut and removed, and the black matrix may be formed in a downward direction of the thin film transistor substrate 110. In this case, an upper partial area of the first information code 240_1 disposed near the outline of the non-display area NDA may be damaged by the cutting of the thin film transistor substrate 110, and a lower partial area of the second information code 240_2 disposed away from the outline of the non-display area NDA may be partially covered with the black matrix BM. In this case, both of the first and second information codes 240_1 and 240_2 might not be read.

In such a case, the recognition device may recognize remaining areas of the first and second information codes 240_1 and 240_2 after the partial areas thereof are cut or covered, and may read the character pattern (e.g., 241_1 or 241_2) or the special pattern (e.g., 242_1 or 242_2) by combining the remaining areas. This will be described in more detail with reference to FIG. 12.

FIGS. 12A through 12E are views illustrating a reading process of an information code of a recognition device according to an exemplary embodiment of the present invention.

Figure 12A:
FIGS. 12A to 12E are views illustrating a reading process of an information code of a recognition device according to an exemplary embodiment of the present invention.
Figure 12B:
Figure 12C:
Figure 12D:
Figure 12E:

FIG. 12A illustrates the first information code 240_1 damaged in the upward direction, and FIG. 12B illustrates a shape of the first information code 240_1 of FIG. 12A before the first information code 240_1 is damaged. FIG. 12C illustrates the second information code 240_2 damaged in the downward direction, and FIG. 12D illustrates a shape of the second information code 240_2 of FIG. 12C before the second information code 240_2 is damaged. FIG. 12E illustrates a final information code obtained by combining the first information code 240_1 of FIG. 12A with the second information code 240_2 of FIG. 12C.

In an exemplary embodiment, a position of the first information code 240_1 may be different from that of the second information code 240_2 in the non-display area NDA, and shapes and sizes of the first information code 240_1 may be the same as those of the second information code 240_2. In this case, the undamaged first information code 240_1 illustrated in FIG. 12B is the same as the undamaged second information code 240_2 illustrated in FIG. 12D. The final information code of FIG. 12E obtained by combining the first information code 240_1 of FIG. 12A with the second information code 240_2 of FIG. 12C may be the same as the first information code 240_1 of FIG. 12B or the second information code 240_2 of FIG. 12D. Thus, the recognition device may correctly read the information contained in the first information code 240_1 and the second information code 240_2 formed in the liquid crystal display device 1000. In addition, as described above, the first information code 240_1 and the second information code 240_2 may include the first and second character patterns 241_1 and 241_2, respectively, and the first and second special patterns 242_1 and 242_2, respectively, and the recognition device may recognize the first special pattern 242_1 and the second special pattern 242_2.

The information codes 240_1 and 240_2 may be read by the image recognition as described above. For example, when the image recognition device receives and processes an image obtained by capturing the first special pattern 242_1 of the first information code 240_1 and the second special pattern 242_2 of the second information code 240_2 using a camera, information included in the first and second special patterns 242_1 and 242_2 may be read.

For example, the recognition device may obtain the image by capturing the information codes 240_1 and 240_2 disposed in the thin film transistor substrate 110. In an exemplary embodiment of the present invention, the images of the information codes 240_1 and 240_2 may be obtained by a single capturing at a time. In an exemplary embodiment of the present invention, the images may be obtained by capturing the information codes 240_1 and 240_2 for each of the information codes 240_1 and 240_2. In this case, the camera of the recognition device may be moved to obtain an image, or the thin film transistor substrate 110 may be moved to capture an image while the camera of the recognition device is fixed.

The captured images are classified and synthesized by the unit of each of the information codes, and thus, the images of the correct information codes may be obtained. For example, the recognition device may find overlap areas by comparing the captured images with each other. For example, when comparing FIG. 12A with FIG. 12C, a first overlap area OLA_1 of FIG. 12A and a second overlap area OLA_2 of FIG. 12C represent the same pattern or shape, and the recognition device may combine the image of the first information code 240_1 with the image of the second information code 240_2 based on this. The final information code (see FIG. 12E) may be generated by combining the images of the first information code 240_1 and the image of the of the second information code 240_2, and the recognition device may read the recorded information in the first information code 240_1 or the second information code 240_2 based on the final information code. Although FIG. 12 illustrates a case where the first character pattern 241_1 and the first special pattern 242_1 of the first information code 240_1 are combined with the second character pattern 241_2 and the second special pattern 242_2 of the second information code 240_2, the present invention is not limited thereto, and the first special pattern 242_1 of the first information code 240_1 and the second special pattern 242_2 of the second information code 240_2 may be combined with each other.

FIGS. 13A to 13E are views illustrating a reading process of an information code of a recognition device according to an exemplary embodiment of the present invention.

Figure 13A:
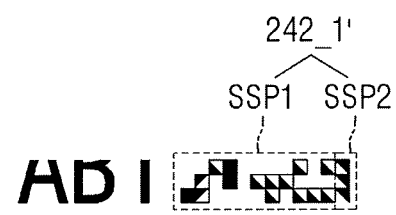
FIGS. 13A to 13E are views illustrating a reading process of an information code of a recognition device according to an exemplary embodiment of the present invention.
Figure 13B:
Figure 13C:
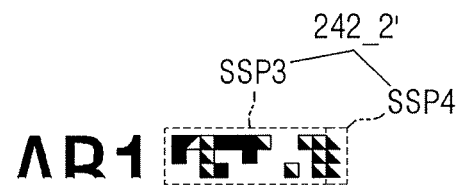
Figure 13D:
Figure 13E:
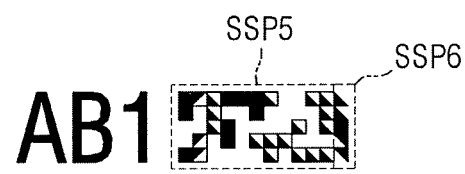

The remaining constituents of each of FIGS. 13A to 13E except some constituents illustrated differently from a corresponding one of FIGS. 12A to 12E are the same as those of a corresponding one of FIGS. 12A to 12E, and duplicate descriptions will be omitted. Hereinafter, the different constituents from FIG. 12 will be described. FIG. 13B illustrates a shape of the first information code of FIG. 13A before the first information code is damaged. FIG. 13D illustrates a shape of the second information code of FIG. 13C before the second information code is damaged. FIG. 13E illustrates a final information code obtained by combining the first information code of FIG. 13A with the second information code of FIG. 13C.

Referring to FIGS. 13A to 13E, a particular pattern may be additionally formed on the right side. For example, in FIGS. 12A to 12E, the special patterns 242_1 and 242_2 having the same shape as each other are respectively formed in the information codes 240_1 and 240_2, and in FIGS. 13A to 13E, a first special pattern 242_1 of the information code 240_1' may partially be different from a second special pattern 242_2' of the information code 240_2'.

The first special pattern 242_1' of FIG. 13A may include a first sub-special pattern SSP1 and a second sub-special pattern SSP2, and the second special pattern 242_2' of FIG. 13C may include a third sub-special pattern SSP3 and a fourth sub-special pattern SSP4.

In this case, the first sub-special pattern SSP1 of the first information code 240_1' and the third sub-special pattern SSP3 of the second information code 240_2' may have the same shape as each other, and the first sub-special pattern SSP1 or second sub-special pattern SSP2 may include information on the production of the thin film transistor substrate 110.

In addition, the second sub-special pattern SSP2 of the first information code 240_1' and the fourth sub-special pattern SSP4 of the second information code 240_2' may have different shapes from each other. The third sub-special pattern SSP2 may include information how far the first information code 240_1' is apart from the outline of the non-display area NDA, and the fourth sub-special pattern SSP4 may include information how far the second information code 240_2' is apart from the outline of the non-display area NDA.

The second sub-special pattern SSP2 and the fourth sub-special pattern SSP4 might not overlap each other when captured images corresponding to the first and second information codes 240_1' and 240_2' are combined with each other. For example, when either one of the second sub-special pattern SSP2 or the fourth sub-special SSP4 pattern is damaged, an area in which a damaged pattern is formed in the combined image may be recognized that nothing is formed, and thus, the recognition device may find which one of the second sub-special pattern SSP2 and the fourth sub-special pattern SSP4 is damaged. In addition, if information recorded on each of the second and fourth sub-special patterns SSP2 and SSP4 is distance information as to how far each of the information codes 240_1 and 240_2 is away from the outline of the non-display area NDA, the recognition device may obtain the information through the second and fourth sub-special patterns SSP2 and SSP4.

For example, FIG. 13A illustrates the first information code 240_1' formed adjacent to an upper side of the non-display area NDA, and FIG. 13C illustrates the second information code 240_2' formed adjacent to the lower side of the non-display area NDA.

The second sub-special pattern SSP2 of FIG. 13A may be formed in a shape in which right triangles are formed in the right upward direction in a repeating manner, which may be understood to mean that the first information code 240_1' is formed apart from the outline of the non-display area NDA by a first distance d1. The fourth sub-special pattern SSP4 of FIG. 13C may be formed in a shape in which right triangles are formed in the left downward direction in a repeating manner, which may be understood to mean that the second information code 240_2' is formed apart from the outline of the non-display area NDA by a second distance d2.

In addition, since the first information code 240_1' of FIG. 13A is disposed to be relatively biased to the upper side compared to the second information code 240_2' of FIG. 13C, some patterns formed on the upper side of the first information code 240_1' might not be recognized. In addition, since the second information code 240_2 of FIG. 13C is disposed to be relatively biased to the lower side compared to the second information code 240_1' of FIG. 13A, some patterns formed on the lower side of the second information code 240_2' might not be recognized.

In this case, by recognizing the second sub-special pattern SSP2 and the fourth sub-special pattern SSP4, the recognition device may find positions of the first information code 240_1' and the second information code 240_2' of FIGS. 13A and 13C in the non-display area NDA, and thus, the recognition device may combine images based on this position information of the first information code 240_1' and the second information code 240_2'. The final information code may be obtained using the combination result, as illustrated in FIG. 13E. Since the shape of undamaged information code can be recovered, the recognition device may read the information recorded on the thin film transistor substrate 110 in a normal manner.

Figure 14:
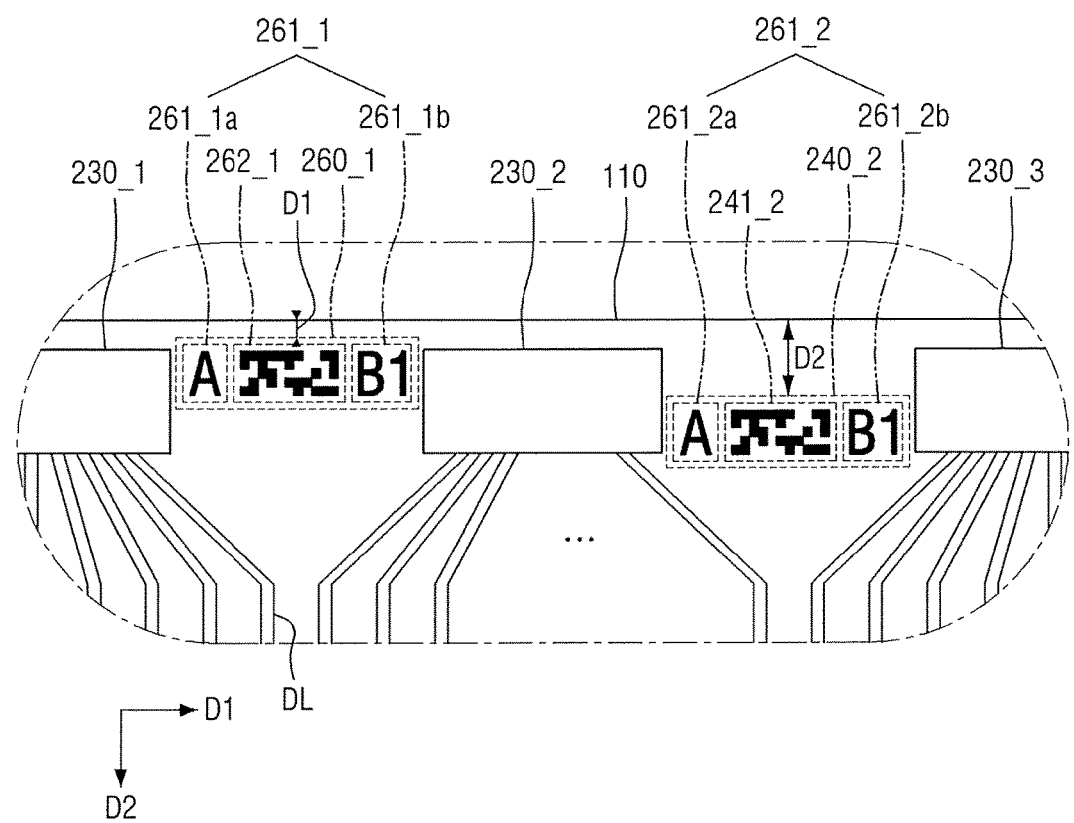
FIG. 14 is an enlarged plan view an area corresponding to the area A of FIG. 3 of a thin film transistor substrate according to an exemplary embodiment of the present invention.

FIG. 14 is an enlarged plan view illustrating an area corresponding to the area A of FIG. 3 of a thin film transistor substrate according to an exemplary embodiment of the present invention.

The remaining constituents of FIG. 14 except some constituents differently from FIG. 3 are the same as those of FIG. 3, and duplicate descriptions will be omitted. Hereinafter, the different constituents from FIG. 3 will be described.

Referring to FIG. 14, a first character patterns 261_1 of the first information code 260_1 may include a first sub-character pattern 261_1*a* and a second sub-character pattern 261_1*b*, and a second character pattern 261_2 of the second information code 260_2 may include a third sub-character patterns 261_2*a* and a fourth sub-character pattern 261_2*b*.

As illustrated in FIG. 14, the first sub-character pattern 261_1*a* may be disposed on the left side of the first special pattern 262_1, and the second sub-character pattern 261_1*b* may be disposed on the right side of the first special pattern 262_1. In this case, even when some portions of the left side or the right side of the information code 260_1 are damaged, the first sub-character pattern 261_1*a* or the second sub-character pattern 261_1*b* may be damaged and the first special pattern 262_1 might not be damaged.

As described above, the first sub-character patterns 261_1*a* and the second sub-character pattern 261_1*b* are read by the human's eye, and the first special pattern 262_1 is read by the recognition device. Thus, an information code may be managed so that the first special pattern 262_1 read by another recognition device is not damaged in the manufacturing process of the display device. Thus, the reliability in reading the information code may be increased.

Figure 15:
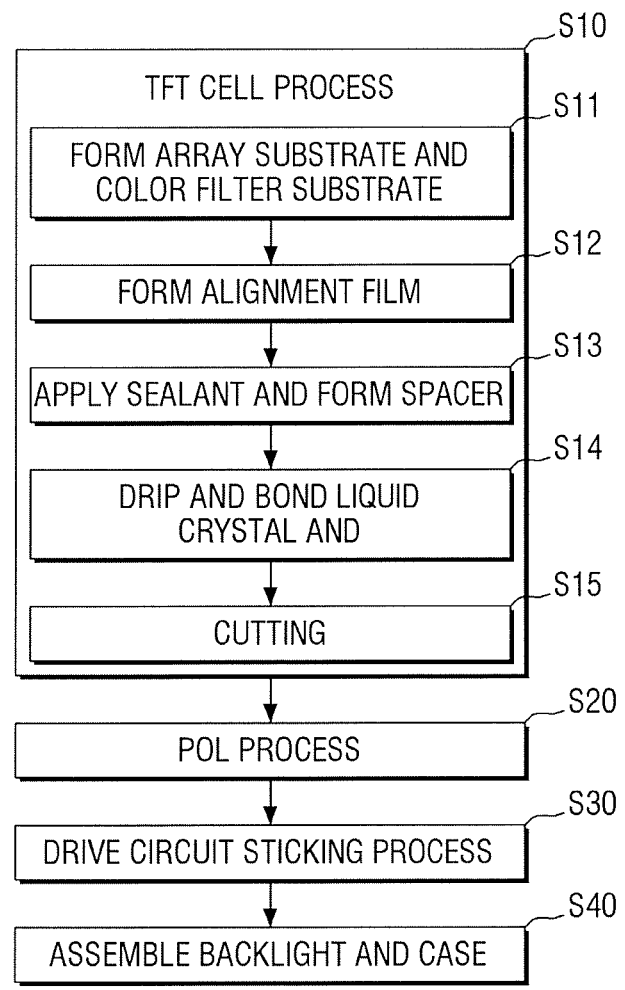
FIG. 15 is a flow chart illustrating a manufacturing process of a liquid crystal display device according to an exemplary embodiment of the present invention in steps.

FIG. 15 is a flowchart illustrating a manufacturing process of a liquid crystal display device according to an exemplary embodiment of the present invention.

The liquid crystal display device forms a liquid crystal cell by performing a thin-film transistor (TFT) cell process (S10). The TFT cell process S10 may include forming a thin film transistor substrate and a color filter substrate 120 (S11), forming an alignment film (S12), applying sealant and forming spacer (S13), dripping and bonding liquid crystal (S14), and cutting (S15).

The forming of the thin film transistor substrate and the color filter substrate 120 (S11) will be described below in more detail. First, an upper substrate and a lower substrate are formed as a color filter substrate 120 and a thin film transistor substrate, respectively. In addition, before applying the alignment film, an initial cleaning is performed for removing foreign materials that may be present on the substrate. At this time, within the display area of the thin film transistor substrate, each of the plurality of gate lines GL1 to GLn and each of the plurality of data lines DL1 to DLm are formed to intersect each other to define the pixels PX, and the thin film transistor is provided at each intersection and is connected to the transparent pixel electrode formed in each pixel PX in an one-to-one correspondence manner.

In addition, red, green and blue color filters, a black matrix BM, and a transparent common electrode are provided on the inner side of the color filter substrate 120. Each of the red, green and blue color filters corresponds to each pixel PX. The black matrix wraps around the red, green and blue color filters and covers the gate lines GL1 to GLn, the data lines DL1 to DLm and non-display elements such as the thin film transistor, or the like. The transparent common electrode covers the red, green and blue color filters and the black matrix BM. At this time, when the black matrix BM is formed greater than an intended size, the black matrix BM may cover an information code formed on the thin film transistor substrate. Thus, this may cause to prevent the information code from being read.

The information codes may be simultaneously formed in the process of forming the gate lines GL1 to GLn. This will be described below in more detail with reference to FIG. 16.

The second step (S12) of the TFT cell process S10 may include forming an alignment film on the color filter substrate 120 and the thin film transistor substrate 110, and the third step (S13) of the TFT cell process S10 may include applying the sealant so that the liquid crystal interposed between the color filter substrate 120 and the thin film transistor substrate 110 does not leak, and spraying a spacer having a constant size to maintain the precise and uniform gap between the color filter substrate 120 and the thin film transistor substrate 110. In an exemplary embodiment, when forming a column spacer on the thin film transistor substrate 110 and the color filter substrate 120, the spacer spraying process may be omitted.

In addition, the fourth step (S14) of the TFT cell process S10 may include dripping the liquid crystal on one of the thin film transistor substrate 110 and the color filter substrate 120, and bonding the thin film transistor substrate 110 and the color filter substrate 120. By bonding the thin film transistor substrate 110 and the color filter substrate 120, a liquid crystal panel including the thin film transistor substrate 110, the liquid crystal, and the color filter substrate 120 may be formed.

In addition, the fifth step (S15) of the TFT cell process S10 may include cutting the thin film transistor substrate 110 in a cell unit.

When some error occurs in the process of cutting the thin film transistor substrate 110, some areas of the information codes formed on the thin film transistor substrate 110 may be cut. Thus, this may cause to prevent the information code from being read.

In addition, a POL process (S20) of sticking a polarizing plate to the outside of each of the completed thin film transistor substrate 110 and the color filter substrate 120 of cell unit may be performed. The polarizing plate may serve to convert light transmitted through a single liquid crystal panel into a linear polarized light.

In addition, a drive circuit sticking process (S30) is performed, and the drive circuit may be stuck in a tape-automated-bonding (TAB) manner in which the drive circuit electrically connected to the thin film transistor substrate 110 is directly mounted on the tape carrier package (TCP).

In addition, a backlight assembling and case assembling (S40) process may be performed. The backlight unit may include a light source, a light guide for guiding the light source, a light guide plate for guiding the light incident from the light source toward the liquid crystal panel, and a plurality of optical sheets which is disposed on a lower surface of the liquid crystal panel.

The case to be assembled includes a top cover, a support main and a cover bottom. The top cover has a square frame shape whose end portion is bent in the form of, e.g., "∧", so that the top cover covers the top, the side and the edge of the liquid crystal panel. The top cover may be configured to display an image formed in the liquid crystal panel by opening the front of the top cover.

In addition, the cover bottom in which the liquid crystal panel and the backlight unit are seated to be a base frame for the assembly of the liquid crystal display device module, may have a square-like plate shape. The cover bottom may be configured by vertically bending the four edges thereof at a predetermined height.

In addition, the support main is seated on the cover bottom and wraps around the edges of the liquid crystal panel and the backlight unit. The support main may be assembled and fastened to the top cover and the cover bottom, and thus, a liquid crystal display device module may be completed.

Although FIG. 15 illustrates the manufacturing process of the liquid crystal display device as an exemplary embodiment, the present invention is applicable to other types of display devices such as an organic light-emitting display device, or the like, without being limited to the liquid crystal display device.

Figure 16:
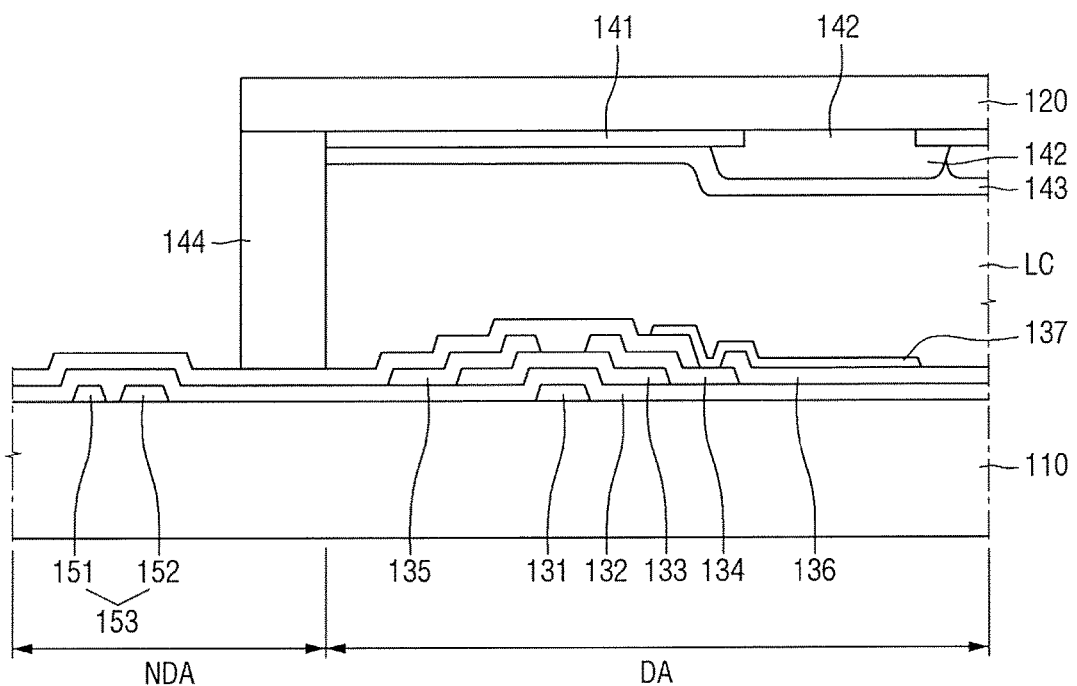
FIG. 16 is a cross-sectional view of a liquid crystal panel according to an exemplary embodiment of the present invention.

FIG. 16 is a cross-sectional view of a liquid crystal panel according to an exemplary embodiment of the present invention.

FIG. 16 is a part of the display panel 100 after the completion of the TFT cell process (S10) in FIG. 15 and is a cross-sectional view taken along the line I-I' of FIG. 2.

Referring to FIG. 16, the thin film transistor substrate 110 and the color filter substrate 120 may be bonded to face each other and the liquid crystal layer LC may be interposed between the thin film transistor substrate 110 and the color filter substrate 120.

The display panel 100 may include the display area DA in which an image is displayed, and the non-display area NDA which is the outer area of the display area DA.

Each of the display area DA and the non-display area NDA will be described in more detail. Within the display area DA of the thin film transistor substrate 110, a gate line and a data line are formed to intersect each other to define a corresponding one of the pixels PX. A pixel electrode 137 may be formed in each of the pixels PX.

Further, at the intersection between the gate line and the data line, a thin film transistor serving as a switching element may be formed. The thin film transistor may include a gate electrode 131, a gate insulating film 132, a semiconductor layer 133, drain and source electrodes 134 and 135, and a protective layer 136.

In addition, a black matrix 141, a color filter 142 and a common electrode 143 may be provided below the color filter substrate 120, and a seal pattern 144 may be formed to bond the color filter substrate 120 and the thin film transistor substrate 110.

At this time, a gate pad and a data pad respectively connected the gate line and the data line may be provided in the non-display area NDA of the thin film transistor substrate 110. In addition, the information codes may be disposed in the non-display area NDA, and each of the information codes may include a character pattern 151 and a special pattern 152.

The character pattern 151 and the special pattern 152 may be formed on the same layer as the gate electrode 131 or the gate line, and may be formed of the same material as each other. The character pattern 151 and the special pattern 152 may be simultaneously formed. For example, the TFT element formed on the thin film transistor substrate 110 is formed by repeating a plurality of mask processes, the gate line and the gate electrode may be formed when the mask process is performed for the first time (e.g., when a first mask process of the plurality of mask processes is performed), and at this time, the information code 153 may be formed.

In an exemplary embodiment, the information code 153 may be formed in the first mask process so that information such as the production history, or the like, of the thin film transistor substrate 110 may be managed in the next process because the first mask process is a first process of processing the thin film transistor substrate 110.

FIGS. 17A to 17G illustrate a method for forming an information code according to an exemplary embodiment of the present invention.

FIGS. 17A to 17G sequentially illustrate the first mask process of the plurality of mask processes for forming a TFT element on a thin film transistor substrate 601. For example, the thin film transistor substrate 601 may correspond to the thin film transistor substrate 110 in e.g., FIG. 3. For example, the first mask process is performed on the thin film transistor substrate 601 before being cut in the unit of cell, but for convenience of explanation, only a partial area of the display panel 100 is illustrated.

Figure 17A:
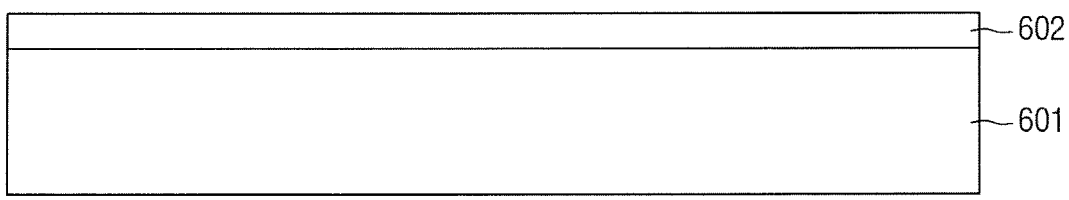
FIGS. 17A to 17G illustrate a method for forming an information code according to an exemplary embodiment of the present invention.

As illustrated in FIG. 17A, a conductive material 602 may be sputtered on the surface of the thin film transistor substrate 601. As the conductive material 602, low resistance non-transparent conductive materials such as aluminum, aluminum alloy, tungsten, copper, chromium, molybdenum, molybdenum alloy, or the like, may be used.

Figure 17B:
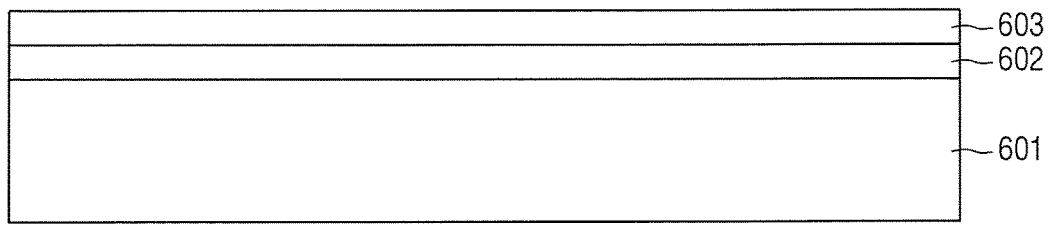

In addition, as illustrated in FIG. 17B, a photoresist layer 603 is formed. The photoresist layer 603 may be partially cured when being irradiated with the ultraviolet light 605. Since the cured area of the photoresist layer 603 is not removed in a development step, the cured area may protect the conductive material 602 formed under the cured area.

Figure 17C:
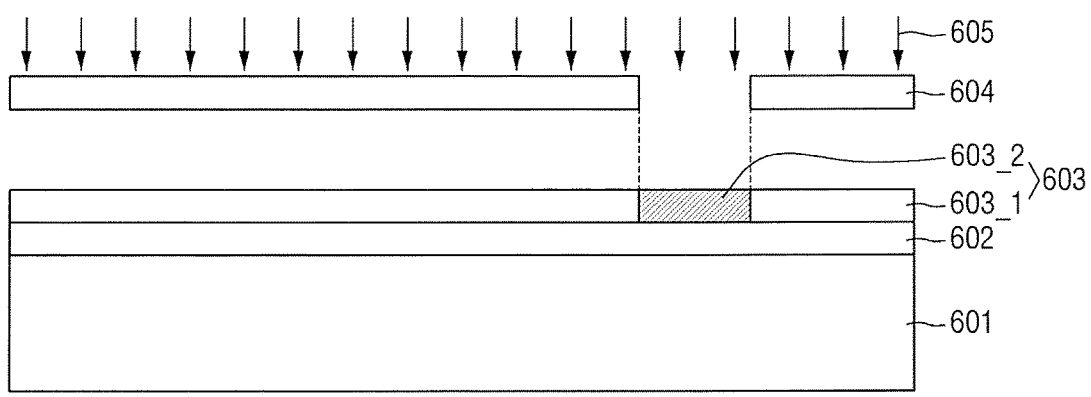

In addition, as illustrated in FIG. 17C, a position where the gate electrode is formed is irradiated with the ultraviolet light 605. The photoresist layer 603 may be irradiated via a mask 604 with ultraviolet light 605. The mask 604 may transmit the ultraviolet light 605 in a first area and may block the ultraviolet light 605 in a second area. Through the ultraviolet light 605 passing through the first area of the mask 605, an area 603_2 of the photoresist layer 603 is irradiated and thus, the area 603_2 may be cured.

Figure 17D:
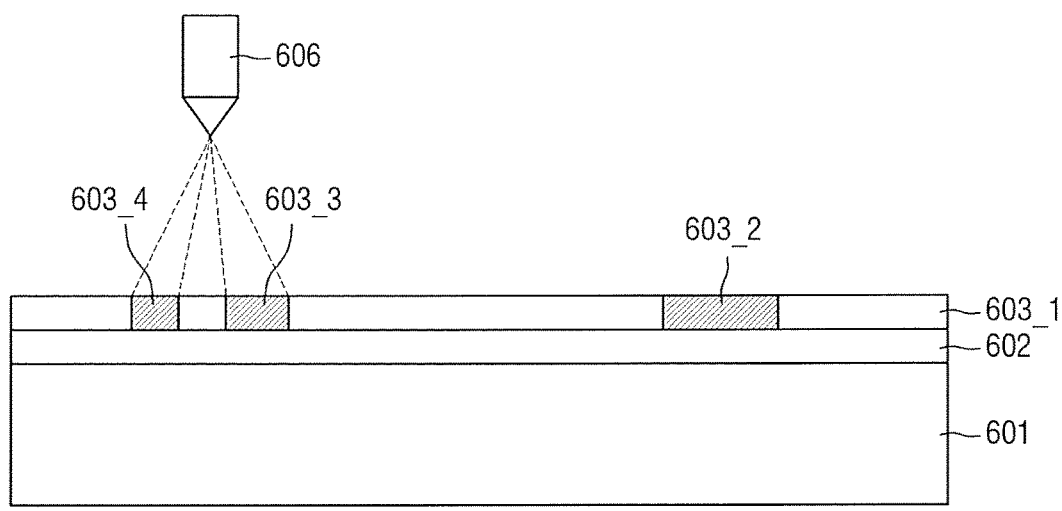

In addition, as illustrated in FIG. 17d, the ultraviolet light 605 is selectively irradiated to positions 603_3 and 603_4 of the photoresist layer 603 on which the character patterns and the special patterns are formed. In this case, the gate line and the gate electrode may be formed in the same form on the plurality of thin film transistor substrates 601 and the character patterns and the special patterns of the information codes may be changed for each time of the thin film transistor substrate 601 being manufactured. Thus, a UV irradiator 606 may be used to selectively irradiate partial areas (e.g., 603_3 or 603_4) of the photoresist layer 603 with the ultraviolet light 605 in accordance with the shapes of the character patterns and the special patterns.

Figure 17E:
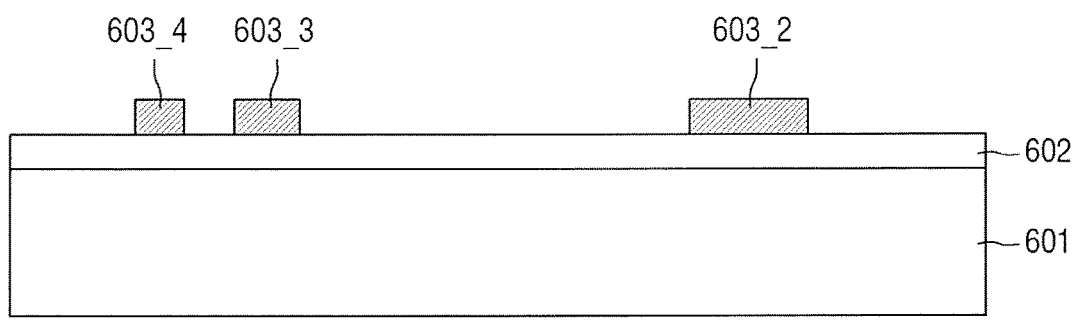

In addition, as illustrated in FIG. 17e, a development process of removing the remaining area except the cured area of the photoresist layer 603 may be performed.

Figure 17F:
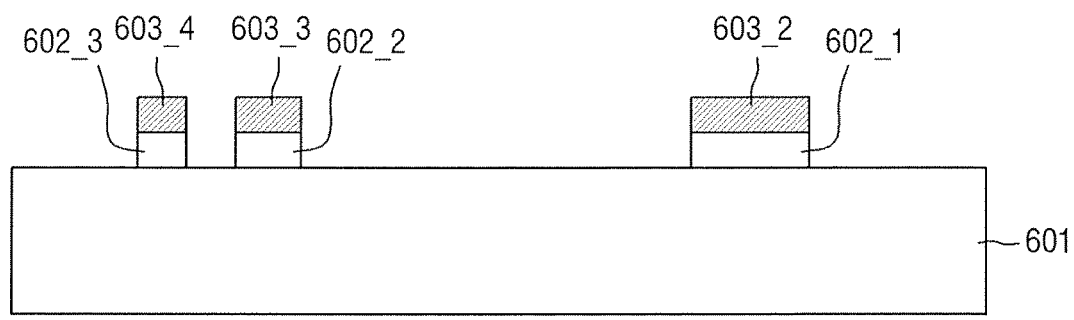

In addition, as illustrated in FIG. 17f, etching for removing the conductive material 602 corresponding to the remaining areas except for the cured area (e.g., 603_2 to 603_4) of the photoresist layer 603 may be performed.

Figure 17G:
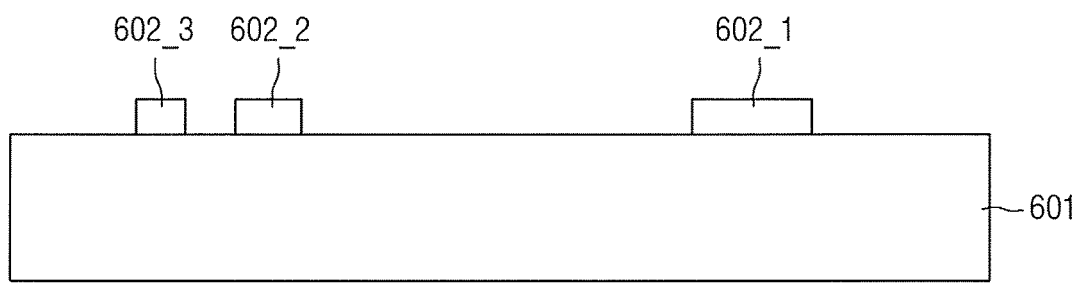

In addition, as illustrated in FIG. 17g, by removing the remaining cured area of the photoresist layer 603, the gate line, the gate electrode and the information code may be formed on the thin film transistor substrate 601 in a desired shape.

While the present invention has been particularly shown and described with reference to exemplary embodiments thereof, it will be understood that various changes in form and detail may be made therein without departing from the spirit and scope of the present invention.

What is claimed is:

1. A display device panel comprising:
   a display area displaying an image, the display area including a plurality of pixels, each of which is connected to one of a plurality of gate lines and one of a plurality of data lines; and
   a non-display area that is different from the display area, the non-display area including a plurality of data pads each of which is connected to one end of each of the plurality of data lines and a plurality of data pad sections each of which includes a corresponding one of the plurality of data pads,
   wherein the non-display area further comprises:
   a depiction of a first information code encoding a first information disposed between first two adjacent data pad sections of the data pad sections and is disposed apart from an outline of the non-display area by a first distance; and
   a depiction of a second information code encoding the first information disposed between second two adjacent data pad sections of the data pad sections and is disposed apart from the outline of the non-display area by a second distance that is larger than the first distance,
   wherein the depiction of the first information code and the depiction of the second information code are disposed directly on a same layer as the gate line, and the depiction of the first information code, the depiction of the second information code and the gate lines are made of a same material.

2. The display device panel of claim 1, wherein the depiction of the first information code comprises at least one of a first character pattern having a form of character or a first special pattern having a form based on a first predetermined rule, and the depiction of the second information code comprises at least one of a second character pattern having a form of character or a second special pattern having a form based on a second predetermined rule.

3. The display device panel of claim 2, wherein the first character pattern has a same form as the second character pattern, and the first special pattern has a same form as the second special pattern, and
   wherein the first information code comprises an information on a production history of the display device panel.

4. The display device panel of claim 3, wherein the first character pattern comprises a first sub-character pattern and a second sub-character pattern, wherein the first sub-character pattern is disposed on one side of the first special pattern, and the second sub-character pattern is disposed on another side of the first special pattern.

5. The display device panel of claim 2, wherein the first special pattern comprises a first sub-special pattern and a second sub-special pattern, wherein the second special pattern comprises a third sub-special pattern and a fourth sub-special pattern, wherein the first character pattern and the second character pattern have a same form as each other, wherein the first sub-special pattern and the third sub-special pattern have a same form as each other, and wherein the second sub-special pattern and the fourth sub-special pattern have different forms from each other.

6. The display device panel of claim 5, wherein the second sub-special pattern comprises information corresponding to the first distance, and the fourth sub-special pattern comprises information corresponding to the second distance.

7. The display device panel of claim 1, wherein at least one of the depiction of the first information code and the depiction of the second information code comprises information corresponding to production of the display device panel.

8. The display device panel of claim 1, wherein the non-display area further comprises a depiction of a third information code encoding the first information, wherein the depiction of the third information code is disposed between third two adjacent data pad sections of the data pad sections and is disposed apart from the outline of the non-display area by a third distance, and wherein the third distance is different from each of the first distance and the second distance.

9. The display device panel of claim 8, wherein the non-display area further comprises depictions of fourth to sixth information codes, wherein the depiction of the fourth information code is disposed between fourth two adjacent data pad sections of the data pad sections and is disposed apart from the outline of the non-display area by a fourth distance, wherein the depiction of the fifth information code is disposed between fifth two adjacent data pad sections of the data pad sections and is disposed apart from the outline of the non-display area by a fifth distance, wherein the depiction of the sixth information code is disposed between sixth two adjacent data pad sections of the data pad sections and is disposed apart from the outline of the non-display area by a sixth distance, wherein the fourth distance is the same as the first distance, wherein the fifth distance is the same as the second distance, and wherein the sixth distance is the same as the third distance.

10. The display device panel of claim 1, wherein the non-display area further comprises depictions of seventh and eighth information codes, wherein each of the depictions of the seventh and eighth information codes is disposed in an area other than an area between the data pad sections, wherein the depiction of the seventh information code is disposed apart from the outline of the non-display area by a seventh distance, wherein the depiction of the eighth information code is disposed apart from the outline of the non-display area by an eighth seventh distance, and wherein the seventh distance and the eighth distance are different from each other.

* * * * *